United States Patent
Frank et al.

(10) Patent No.: US 11,173,795 B2
(45) Date of Patent: *Nov. 16, 2021

(54) VEHICLE WITH AC-TO-DC INVERTER SYSTEM FOR VEHICLE TO-GRID POWER INTEGRATION

(71) Applicant: Cummins Electrified Power NA Inc., Wilmington, DE (US)

(72) Inventors: Andrew Frank, San Jose, CA (US); Chan-Chiao Lin, San Jose, CA (US); Patrick Kaufman, San Jose, CA (US); Sean Fountain, San Jose, CA (US); Bram Bonsen, San Jose, CA (US)

(73) Assignee: Cummins Electrified Power NA Inc., Wilmington, DE (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/673,047

(22) Filed: Nov. 4, 2019

(65) Prior Publication Data

US 2020/0164749 A1 May 28, 2020

Related U.S. Application Data

(63) Continuation of application No. 15/915,818, filed on Mar. 8, 2018, now Pat. No. 10,464,423, which is a
(Continued)

(51) Int. Cl.
*B60L 53/14* (2019.01)
*B60L 53/22* (2019.01)
(Continued)

(52) U.S. Cl.
CPC .............. *B60L 53/14* (2019.02); *B60L 1/006* (2013.01); *B60L 50/16* (2019.02); *B60L 53/22* (2019.02);
(Continued)

(58) Field of Classification Search
CPC .......... B60L 53/14; B60L 58/12; B60L 50/16; B60L 55/00; B60L 53/63; B60L 53/22;
(Continued)

(56) References Cited

U.S. PATENT DOCUMENTS 5,845,731 A 12/1998 Buglione et al.
6,048,289 A 4/2000 Hattori et al.
(Continued)

FOREIGN PATENT DOCUMENTS

CN 101209667 A 7/2008
CN 102381177 A 3/2012
(Continued)

OTHER PUBLICATIONS

Adel, B et af., "Simulation and Comparison of HEY Battery Control for Best Fuel Economy and Longer Battery Life", World Electric Vehicle Journal, ISSN 2032-6653, Nov. 5-9, 2010, vol. 4, pp. 000421-010426 [online], [retrieved on May 5, 2014]. Retrieved from the Internet: <URL: http://www.evs24.org/wevajournallphp/download.php?f=voi4/WEVA4-4060.pdf&g- t;; introduction.
(Continued)

*Primary Examiner* — Yuen Wong
(74) *Attorney, Agent, or Firm* — Faegre Drinker Biddle & Reath LLP

(57) ABSTRACT

Vehicles that are capable of connecting to the AC grid are described that comprise a prime mover and at least one motor generator. In one embodiment, a vehicle may be constructed as a plug-in hybrid system and using the powertrain under controller instruction to either place power on an AC power line (to service AC grids) or to draw power from the AC power line to add electrical energy to the batteries on the vehicle. In some aspects, vehicles may test whether the power needed to service the AC power line may be satisfied by the on-vehicle batteries or, if not, whether and
(Continued)

how much power to extract from the prime mover. In some aspects, vehicles may have a thermal management system on board to dynamically supply desired heat dissipation for the powertrain, if the powertrain is using the prime mover to supply power to the AC grid.

21 Claims, 9 Drawing Sheets

Related U.S. Application Data continuation of application No. 15/356,612, filed on Nov. 20, 2016, now Pat. No. 9,914,361, which is a continuation of application No. 14/887,158, filed on Oct. 19, 2015, now Pat. No. 9,505,311, which is a continuation of application No. 14/304,955, filed on Jun. 15, 2014, now Pat. No. 9,193,273.

(51) Int. Cl.
| | | |
|---|---|---|
| H02J 3/32 | (2006.01) | |
| H02J 3/38 | (2006.01) | |
| B60L 58/12 | (2019.01) | |
| B60L 50/16 | (2019.01) | |
| B60L 55/00 | (2019.01) | |
| B60L 53/63 | (2019.01) | |
| H02J 7/00 | (2006.01) | |
| B60W 20/13 | (2016.01) | |
| B60L 1/00 | (2006.01) | |

(52) U.S. Cl.
CPC .............. B60L 53/63 (2019.02); B60L 55/00 (2019.02); B60L 58/12 (2019.02); B60W 20/13 (2016.01); H02J 3/32 (2013.01); H02J 3/381 (2013.01); H02J 7/00 (2013.01); *B60L 2200/40* (2013.01); *B60L 2210/30* (2013.01); *B60L 2210/40* (2013.01); *B60L 2240/34* (2013.01); *B60L 2240/36* (2013.01); *B60L 2240/445* (2013.01); *B60L 2260/50* (2013.01); *B60Y 2200/91* (2013.01); *B60Y 2200/92* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y04S 10/126* (2013.01); *Y10S 903/903* (2013.01); *Y10S 903/93* (2013.01)

(58) Field of Classification Search
CPC .. B60L 1/006; B60L 2210/30; B60L 2210/40; B60L 2200/40; B60L 2240/34; B60L 2240/36; B60L 2240/445; B60L 2260/50; B60W 20/13; B60W 10/06; B60W 10/26; B60W 2510/246; B60W 2510/244; B60W 2710/0677; Y02E 60/00; Y02T 90/12; Y02T 90/16; Y02T 10/7072; Y02T 10/70; Y02T 90/14; B60Y 2200/91; B60Y 2200/92; Y04S 10/126; Y10S 903/93; Y10S 903/903; H02J 3/32; H02J 3/381; H02J 7/00; H02J 2300/10; H02J 2310/48
See application file for complete search history.

(56) References Cited

U.S. PATENT DOCUMENTS

| | | | |
|---|---|---|---|
| 6,054,844 A | 4/2000 | Frank | |
| 6,083,139 A | 7/2000 | Deguchi et al. | |
| 6,116,363 A | 9/2000 | Frank | |
| 6,190,282 B1 | 2/2001 | Deguchi et al. | |
| 6,328,122 B1 | 12/2001 | Yamada et al. | |
| 6,432,023 B1 | 8/2002 | Ahner et al. | |
| 6,569,055 B2 | 5/2003 | Urasawa et al. | |
| 6,740,002 B1 | 5/2004 | Stridsberg | |
| 6,809,429 B1 | 10/2004 | Frank | |
| 6,837,215 B2 | 1/2005 | Nishigaki et al. | |
| 6,847,189 B2 | 1/2005 | Frank | |
| 6,885,113 B2 | 4/2005 | Lim | |
| 6,886,648 B1 | 5/2005 | Hata et al. | |
| 6,931,850 B2 | 8/2005 | Frank et al. | |
| 6,991,054 B2 | 1/2006 | Takaoka et al. | |
| RE39,023 E | 3/2006 | Sasaki | |
| 7,021,409 B2 | 4/2006 | Tamor | |
| 7,040,433 B2 | 5/2006 | Yamamoto et al. | |
| 7,117,963 B2 | 10/2006 | Saito et al. | |
| 7,154,236 B1 | 12/2006 | Heap | |
| 7,163,480 B2 | 1/2007 | Supina et al. | |
| 7,169,074 B2 | 1/2007 | Raghavan et al. | |
| 7,196,430 B2 | 3/2007 | Yang | |
| 7,261,672 B2 | 8/2007 | Frank et al. | |
| 7,315,090 B2 | 1/2008 | Yang | |
| 7,467,678 B2 | 12/2008 | Tanaka et al. | |
| 7,597,164 B2 | 10/2009 | Severinsky et al. | |
| 7,632,202 B2 | 12/2009 | Supina et al. | |
| 7,908,067 B2 | 3/2011 | Soliman et al. | |
| 8,028,778 B2 | 10/2011 | Luo et al. | |
| 8,062,172 B2 | 11/2011 | Supina et al. | |
| 8,083,016 B2 | 12/2011 | Naik et al. | |
| 8,215,425 B2 | 7/2012 | Hayashi et al. | |
| 8,215,426 B2 | 7/2012 | Katsuta et al. | |
| 8,234,025 B2 | 7/2012 | Conlon et al. | |
| 8,307,924 B2 | 11/2012 | Wang et al. | |
| 8,474,556 B2 | 7/2013 | Wang et al. | |
| 8,540,601 B2 | 9/2013 | Wang et al. | |
| 8,833,324 B2 | 9/2014 | O'Brien et al. | |
| 8,845,482 B2 | 9/2014 | Zhang et al. | |
| 8,975,897 B2 * | 3/2015 | Yoshioka ........... | G01R 31/3651 320/132 |
| 8,997,480 B1 | 4/2015 | Bennett | |
| 9,045,136 B2 | 6/2015 | Frank et al. | |
| 9,193,273 B1 | 11/2015 | Frank et al. | |
| 9,421,856 B2 | 8/2016 | Frank et al. | |
| 9,505,311 B2 | 11/2016 | Frank et al. | |
| 9,914,361 B2 | 3/2018 | Frank et al. | |
| 10,464,423 B2 | 11/2019 | Frank et al. | |
| 2006/0048983 A1 | 3/2006 | Urakabe et al. | |
| 2008/0223636 A1 | 9/2008 | Gutsche | |
| 2008/0223637 A1 | 9/2008 | Bartilson | |
| 2008/0300743 A1 | 12/2008 | Conlon et al. | |
| 2009/0030712 A1 | 1/2009 | Bogolea et al. | |
| 2009/0145674 A1 | 6/2009 | Lee et al. | |
| 2009/0189456 A1 | 7/2009 | Skutt | |
| 2009/0248228 A1 | 10/2009 | Miller | |
| 2010/0099532 A1 | 4/2010 | Cashen | |
| 2011/0287888 A1 | 11/2011 | Muller et al. | |
| 2011/0305550 A1 | 12/2011 | Haire | |
| 2012/0077632 A1 | 3/2012 | Babbitt et al. | |
| 2012/0226384 A1 | 9/2012 | Forbes, Jr. | |
| 2012/0309587 A1 | 12/2012 | Nozaki | |
| 2013/0138283 A1 | 5/2013 | Cho | |
| 2013/0151054 A1 | 6/2013 | Ortmann et al. | |
| 2013/0324357 A1 | 12/2013 | Stenson | |
| 2014/0228167 A1 | 8/2014 | Frank et al. | |
| 2014/0256505 A1 | 9/2014 | Dalum et al. | |

FOREIGN PATENT DOCUMENTS

| | | |
|---|---|---|
| CN | 204136757 U | 2/2015 |
| RU | 2511929 C2 | 4/2014 |
| WO | 2006/056803 A1 | 6/2006 |
| WO | 2009/092196 A1 | 7/2009 |
| WO | 2012/082063 A1 | 6/2012 |
| WO | 2012/152613 A1 | 11/2012 |

OTHER PUBLICATIONS

Hadley and Tsvetkova, Potential Impacts of Plug-in Hybrid Electric Vehicles on Regional Power Generation; Oak Ridge National Laboratory, Jan. 2008, downloaded from http://web.ornl.gov/info/

(56) References Cited

OTHER PUBLICATIONS omlreview/v41.sub.--1.sub.—08/regional.sub.phe- v.sub.--analysis. pdf.
International Search Report and Written Opinion in PCT/US2014/014234, dated Aug. 12, 2014.
International Search Report and Written Opinion in PCT/US2014/014251, dated Sep. 26, 2014.
International Search Report and Written Opinion issued by the ISA/RU, Federal Institute of Industrial Property, dated Oct. 15, 2015 for International Application No. PCT/US2015/035793; 6 pages.
International Search Report in PCT/US2014/014215.
Kempton and Tomic, Vehicle-to-grid power fundamentals: Calculating capacity and net revenue, Journal of Power Sources, Dec. 8, 2004, downloaded from http://ver2009.inee.org.br/Downloads/KempTom-V2G-Fundamentals05.pdf.
Kempton and Tomic, Vehicle-to-grid power implementation: From stabilizing the grid to supporting large-scale renewable energy, Journal of Power Sources, Dec. 8, 2004, downloaded from http://www.civil.ist.utl.pt/.about.martinez/PDF/ELECTRICMOVE/Paper11.pdf.
Tomic and Kempton, Using Fleets of Electric-Drive Vehicles for Grid Support, Journal of Power Sources, Mar. 6, 2007 downloaded from http://www.udel.edu/V2G/docs/TomicKemp-Fleets-proof-07.pdf?origin=publica- tion.sub.—detail.
Written Opinion in PCT/US2014/014215.

\* cited by examiner

USE OF BATTERY FOR EFFICIENT ENERGY GENERATION

VEHICLE WITH AC-TO-DC INVERTER SYSTEM FOR VEHICLE TO-GRID POWER INTEGRATION

CROSS-REFERENCE TO RELATED APPLICATIONS

The present application is a Continuation Application of—and claims benefit of—application Ser. No. 14/304,955, filed on Jun. 15, 2014, and application Ser. No. 14/887,158 filed on Oct. 19, 2015, and application Ser. No. 15/356,612 filed on Nov. 20, 2016, all entitled "VEHICLE WITH AC-TO-DC INVERTER SYSTEM FOR VEHICLE-TO-GRID POWER INTEGRATION" which are herein incorporated by reference in their entirety.

BACKGROUND

In the field of electric vehicles (EVs), hybrid electric vehicles (HEVs) and plug-in hybrid electric vehicles (PHEVs), there are many possible powertrains that may affect a wide variety of operating modes. For example, in the field of HEVs alone, HEV powertrains may be constructed to affect series, parallel, series-parallel modes of operation. In addition, certain of these modes may be constructed to operate according to different policies, —e.g., charge-sustaining, charge-depletion and the like.

In some of these vehicles, it may be desired to connect the vehicle to an Alternating Current (AC) power line and to transfer power to and/or from the AC power line to the vehicle. This may be desired, in particular, with vehicles owned and/or operated by the power utility companies—that are tasked to go into the field to aid with repair, installation or replacement with portions of the power lines.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Some embodiments of the present application provide for Vehicles that are capable of connecting to the AC grid are described that comprise a prime mover and at least one motor generator. In one embodiment, a vehicle may be constructed as a plug-in hybrid system and using the powertrain under controller instruction to either place power on an AC power line (to service AC grids) or to draw power from the AC power line to add electrical energy to the batteries on the vehicle. In some aspects, vehicles may test whether the power needed to service the AC power line may be satisfied by the on-vehicle batteries or, if not, whether and how much power to extract from the prime mover. In some aspects, vehicles may have a thermal management system on board to dynamically supply desired heat dissipation for the powertrain, if the powertrain is using the prime mover to supply power to the AC grid.

In one aspect, a vehicle for connecting to an Alternating Current (AC) power line is disclosed wherein the vehicle comprising: a prime mover; a first electric motor-generator, the first electric motor-generator mechanically coupled to the prime mover via a first clutch; a second electric motor-generator, the second electric motor mechanically coupled to the first electric motor-generator; a battery, the battery electrically coupled to the first electric motor-generator and the second electric motor-generator, the battery capable of receiving or supplying electrical energy to the first electric motor-generator and the second electric motor-generator; an inverter, the inverter electrically coupled to the first motor-generator, the second motor-generator and the battery, the inverter capable of connecting to an AC power line; and a controller, the controller capable of supplying control signals to the prime mover, the electric motor-generator, and the electric motor such that the controller is capable of dynamically affecting the flow of electrical power to or from the AC power line; wherein further the controller further comprises a processor and a computer readable storage media, the computer readable storage media comprising instructions that, when read by the processor, causes the vehicle to perform the following: receive signals correlating to the electrical load demand on the AC power line; if the demand may be met by the battery, supply electrical power to the AC power line from the battery to one of the first and the second motor-generators via the inverter; if the demand may not be met by the battery, supply electrical power to the AC power line from the prime mover to one of the first and the second motor-generators via the inverter; and determine optimum efficiency of the prime mover; and dynamically set operating characteristics of the prime mover to substantially hold the prime mover on its Ideal Operating Line (IOL).

In one aspect, a method for connecting a vehicle to an AC power line is disclosed, where the vehicle comprises a prime mover, at least one motor-generator, a battery, an inverter, a controller; the controller comprising a processor and a computer-readable storage media comprising instructions that, when read by the processor, causes the vehicle to perform the following steps: receiving signals correlating to the load demand on the AC power line; determining if the vehicle is capable of supplying a portion of the load demands on the AC power line; if the portion of the load demand may be supplied by the battery, supplying the portion of the load demand by the battery; determining dynamically whether the portion of the load demand is to be supplied by using the prime mover; determining substantially the optimum efficiency of the prime mover to supply the portion of the load demand; setting substantially the operating characteristics of the prime mover to supply the portion of the load demand; and dynamically adjusting the operating characteristics of the prime mover according to dynamic load conditions.

In one aspect, a controller is disclosed, the controller controlling a vehicle connected to an AC power line, where the vehicle comprises a prime mover, at least one motor-generator, a battery, an inverter; the controller further comprising a processor and a computer-readable storage media comprising instructions that, when read by the processor, causes the vehicle to perform the following steps: receiving signals correlating to the load demand on the AC power line; determining if the vehicle is capable of supplying a portion of the load demands on the AC power line; if the portion of the load demand may be supplied by the battery, supplying the portion of the load demand by the battery; determining dynamically whether the portion of the load demand is to be supplied by using the prime mover; determining substantially the optimum efficiency of the prime mover to supply the portion of the load demand; setting substantially the operating characteristics of the prime mover to supply the portion of the load demand; and dynamically adjusting the operating characteristics of the prime mover according to dynamic load conditions.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1A:
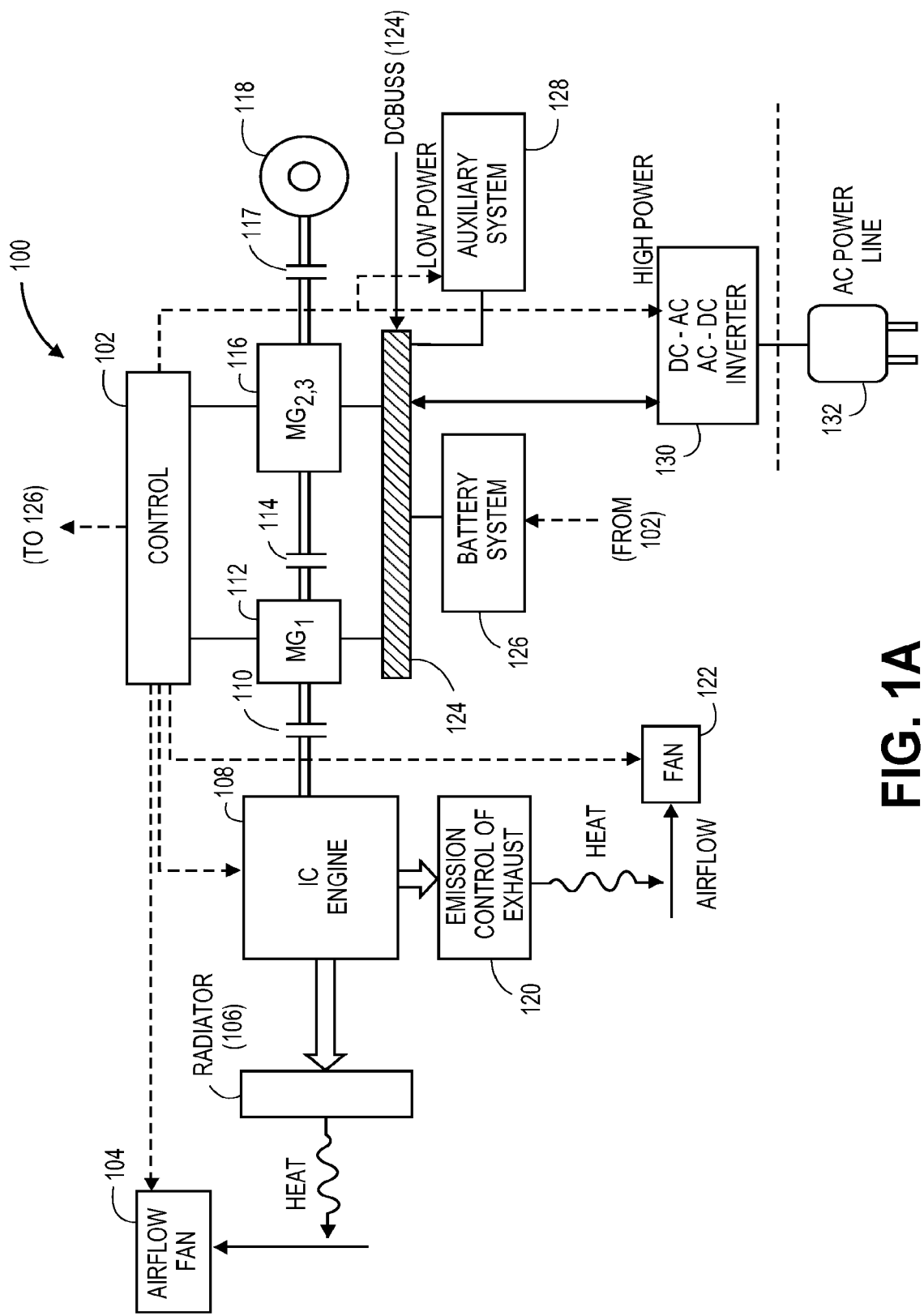
FIGS. 1A and 1B show several possible embodiment of a vehicle, as made according to the principles of the present application.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

It may be desired to have an EV, HEV and/or PHEV vehicle connect to an AC power line and transfer electric power from the vehicle to the AC power line—as well as to transfer power from the AC power line to the vehicle. In one example, power utility companies own and operate fleets of vehicles to dispatch to the field and repair, install and/or replace parts of the power lines and/or grid.

In many aspects of the present application, vehicles and/or systems are disclosed that may be able to control the power generation at a higher energy efficiency for energy transfer from "on-board" vehicle liquid or carbon based fuel to electric energy (e.g., possibly to a power grid) and possibly, while maintaining the State of Charge (SOC) of the main vehicle traction energy storage battery. This higher energy efficiency may allow the mobile power platform (e.g., the engine and/or the vehicle chassis) to transfer high power. In one aspect, this may be possible by avoiding the typical high heat rejection of a standard internal combustion engine—e.g., usually because of the inefficient control of engine power (e.g., throttling) or the use of a single generator.

In one aspect, a vehicle may be designed with a large enough battery pack to store enough energy to allow leveling the load from a "prime mover" (e.g., an Internal Combustion (IC) engine, a fuel cell, a Compressed Natural Gas (CNG) engine or any other engine/mover that may rely on a fuel source other than electricity, like gasoline, natural gas, any other carbon-based fuel or any liquid fuel). It will be appreciated that any mention of one of these types of engines/movers herein also applies to other engines/movers of this description. Due to the large traction battery of PHEV designs, it may be desirable and/or possible to operate the engine at a much higher efficiency and thus incurring much less heat rejection by using the batteries to absorb and deliver continuous power to the load.

Figure 1B:
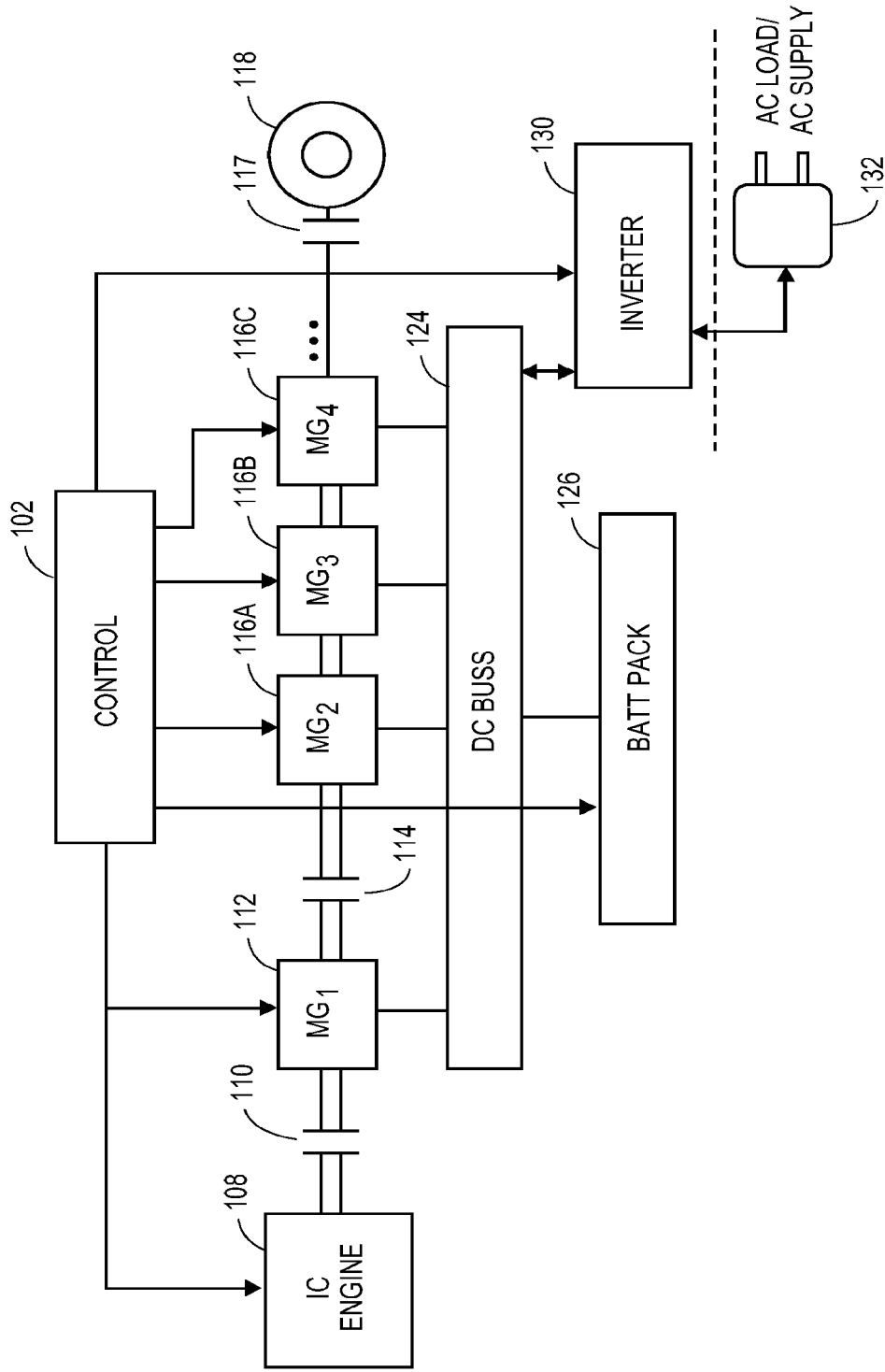

FIG. 1A is one example of vehicle that may be suitable for the purposes of the present application. Vehicle 100 may comprise a controller 102 having sufficient processor(s) and computer readable storage media having computer readable instructions stored thereon to control the vehicle as further described herein. Vehicle 100 further comprises a powertrain—e.g., IC engine 108, clutch 110, motor-generator (MG1) 112, clutch 114, motor-generator 116 that may transfer some portion of its power to a set of wheels 118 for motive power of the vehicle. FIG. 1B is another example of a portion of the vehicle's powertrain that employs multiple motor-generators—e.g. MG2 (116a), MG3 (116b), MG4 (116c), etc. that may provide efficient variable electrical power as load demands vary on AC load 132.

As may be seen, many components may send signals to and/or receive signals from controller 102. For example, the dotted lines indicate some lines of possible signal paths from controller 102. Other components may also be under control from controller 102—e.g., clutches 110, 114, and 117— among other components.

Vehicle 100 may further comprise a DC Bus 124 for communication of the powertrain with battery system 126 and auxiliary system 128 for low power transfer to and from the vehicle—e.g., for example, to and from power transfer to a local grid for charging batteries 126. In addition, a higher power DC/AC, AC/DC inverter 130 may also be in communication with the DC Bus 124—that, in turn, may be able to connect with a high power AC power line 132 that is external to the vehicle, as may be desired from time to time for power utility repair vehicles or the like.

As will be discussed in greater detail herein, vehicle 100 may be employed to supply power to the grid—which may be supplied—e.g., by the batteries and/or by the IC engine. Heat dissipation is desirable, especially if the IC Engine is running and supplying electrical energy to the grid (and especially if the vehicle is stationary while doing so). Heat of the vehicle may be controlled and/or dissipated in at least two paths: (1) heat dissipated by a radiator 106 in thermal communication with the IC engine and powertrain and (2) the emission of heated exhaust products via various components (122)—e.g., catalytic converter(s), tailpipes and the like.

To aid in the heat dissipation, vehicle 100 may further comprise one or more fans (e.g., fans 104 and 122) to provide airflow to speed the dissipation of heat from the vehicle. Fan 104 may be provided to help dissipate heat away from the radiator—while fan 122 may be provided to dissipate heat away from the engine and/or exhaust system of the vehicle. Such fans may be rated to supply a desired air speed (e.g., possibly 50 mph, more or less) in order to cool the vehicle as though it were in motion at normal speed.

Figure 2:
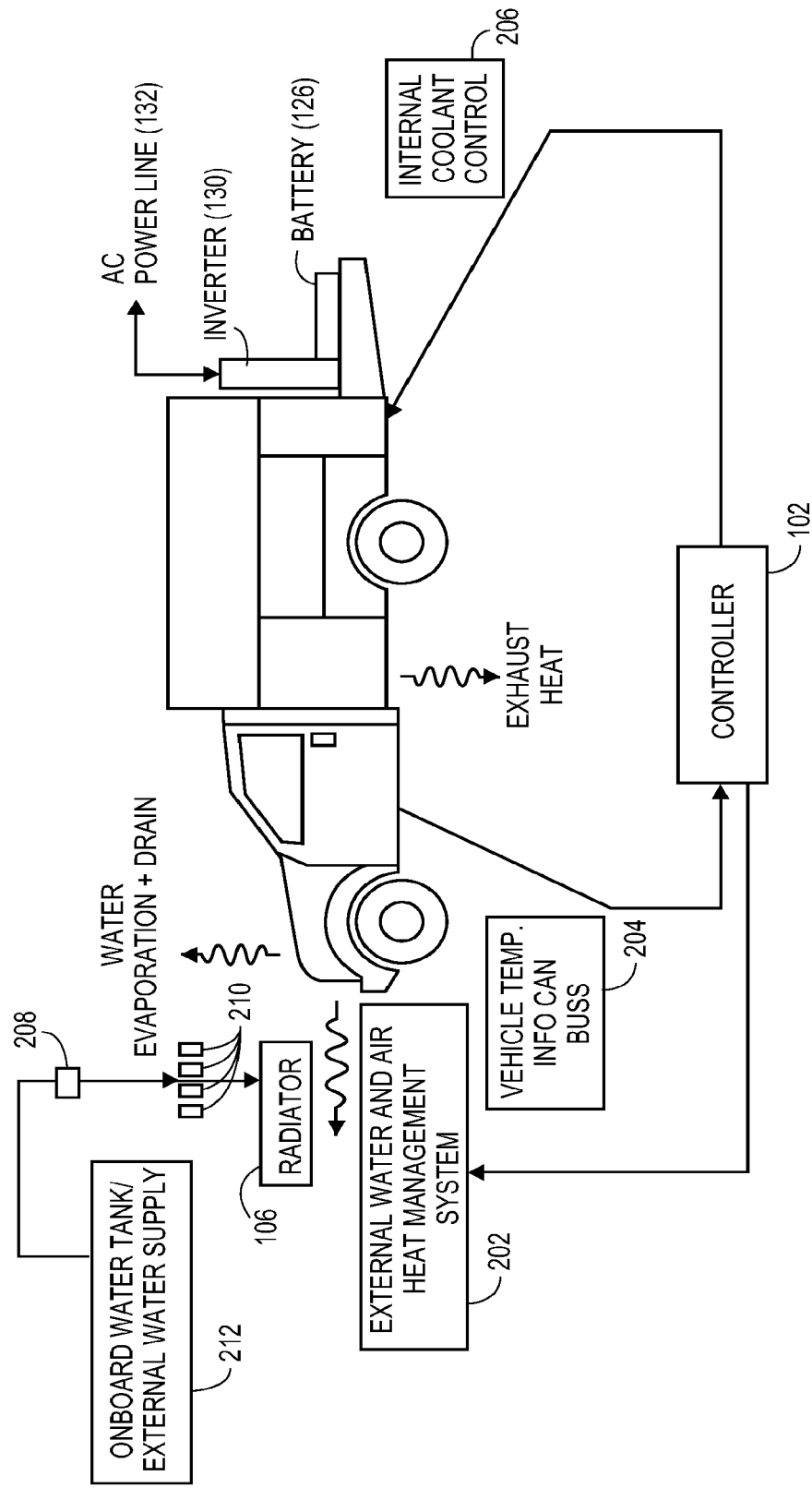
FIG. 2 shows one possible embodiment of a vehicle that may control various aspects of heat management according to the principles of the present application.

FIG. 2 depicts one example of a vehicle suitable to connect to the grid. Vehicle 200 may comprises controller 102, battery 126, inverter 103 (to connect to external AC load 132). Vehicle 200 may also comprise a Can Bus 204 that may monitor vehicle temperature information in the various components of the vehicles (e.g., IC engine, MG(s), coolants, exhaust temp, etc.). Controller 102 having such heat and/or temperature data may control internal coolants 206. In addition, controller 102 may control an external water and/or air heat management system 202.

In addition, vehicle 200 may be connected further to a water supply 212 for additional cooling of the IC engine and vehicle. The water supply 212 may be contained in an onboard storage tank and/or externally supplied (e.g., by a fire hydrant or a garden hose, as the case may be). A port 208 may be provides for ease of attaching such an external water supply to the vehicle. Another port (not shown) might be provided for out-flow of heated water or liquid, as desired. In addition, spray nozzles 210 may be provided at desired locations at the vehicle (e.g., in the engine well, directed at the engine and/or its block or directed towards the exhaust system. By applying water to heated portions of the powertrain, it may be possible to further dissipate heat by evaporation and/or draining of heated water.

In many of the examples above, it may be desirable to have the vehicle designed to have a thermal management system (e.g., a system with either one or more airflow fans and/or external coolant flow with possible ports and nozzles and/or the like) with sufficient heat dissipation in order to keep the vehicle and/or powertrain within desired temperature specifications during continuous ENGINE ON operations for a sufficient time period up to and through a point of temperature equilibrium.

Examples of Vehicle Operation

Figure 3:
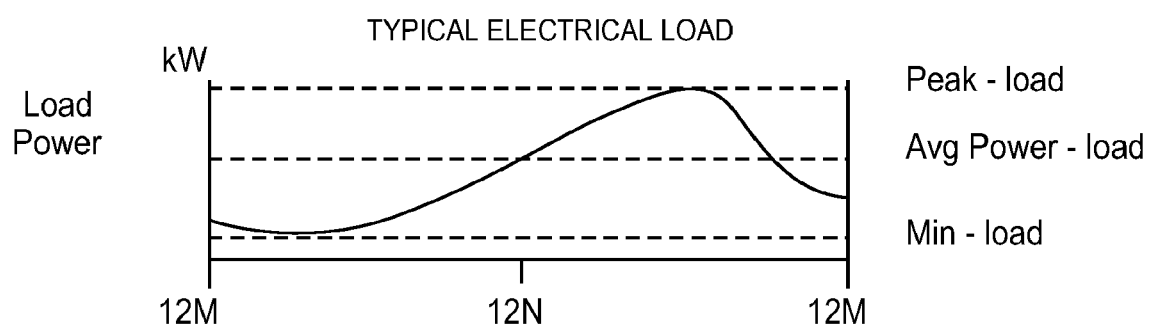
FIG. 3 shows an exemplary load power demand curve over time.

As noted, many of the vehicles described herein may be employed by utility power companies or the like that occasionally may have the opportunity to connect such a vehicle to an AC grid (e.g., either local and/or high powered grid). It may also be desired that such a vehicle export power to the local and/or high power AC grid for a variety of purposes (e.g., diagnostics, power supply, etc.). FIG. 3 is a graph of a typical electrical load for an exemplary portion of the grid for which the vehicle may be dispatched to service. As may be seen, power varies on a 24 hour cycle as shown. From midnight to morning (e.g., approximately 6 AM, or as a people start demanding power from the grid), the electrical load may approach a minimum load (Min). As the day progresses, the power demand grows, e.g., past some average power (Avg) level and increasing until some peak power (Peak) is demanded by the grid. At some point during the evening, this peak power diminishes back towards the Min level, as shown.

Figure 4A:
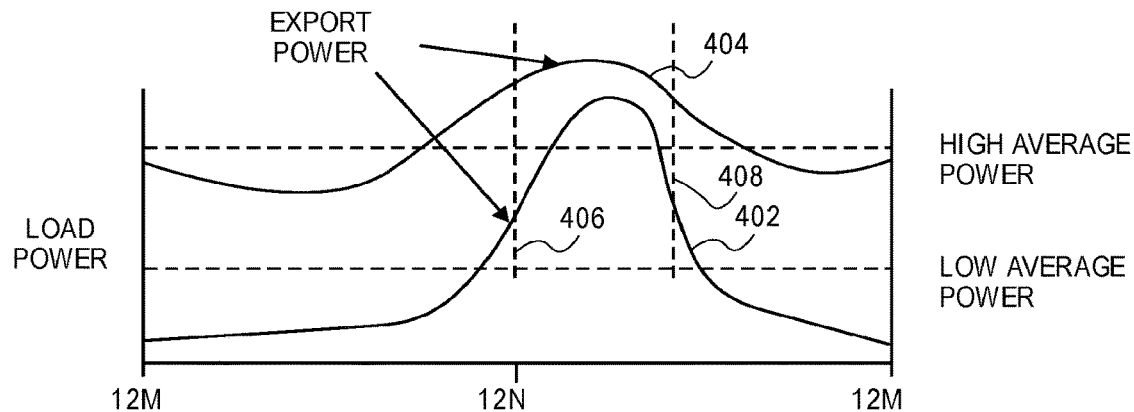
FIGS. 4A and 4B depict operational scenarios and possible operational states/modes of the vehicle, respectively.

Apart from supplying a normal electrical load (as shown in FIG. 3), a vehicle may be called upon to supply electrical loads that are outside of the normal demand. Merely for exposition, FIG. 4A depicts two power demand scenarios that may be managed by the various vehicles described herein. In a first case, curve 402 is depicting a lower power demand scenario where the bulk of the power demand shows a low power average over time. Such peaks may even rise beyond a high power average at times. In a second case, curve 404 depicts a higher power scenario where the average demand on the grid is closer to the high power average for that time. It may be seen that curve 404 may occasionally peak over the high power average (e.g. starting in and around dotted line 406). At this point, there may be desired to export power from the vehicle to the grid to meet demand spikes. When the spike in demand diminishes (e.g., as depicted as dotted line 408), there may not be desired for extraordinary export power. In one aspect, if the power demand is high, then it may be desirable to operate the engine continuously. If the demand is low, then the vehicle may operate on battery to supply power much of the time.

Figure 4B:
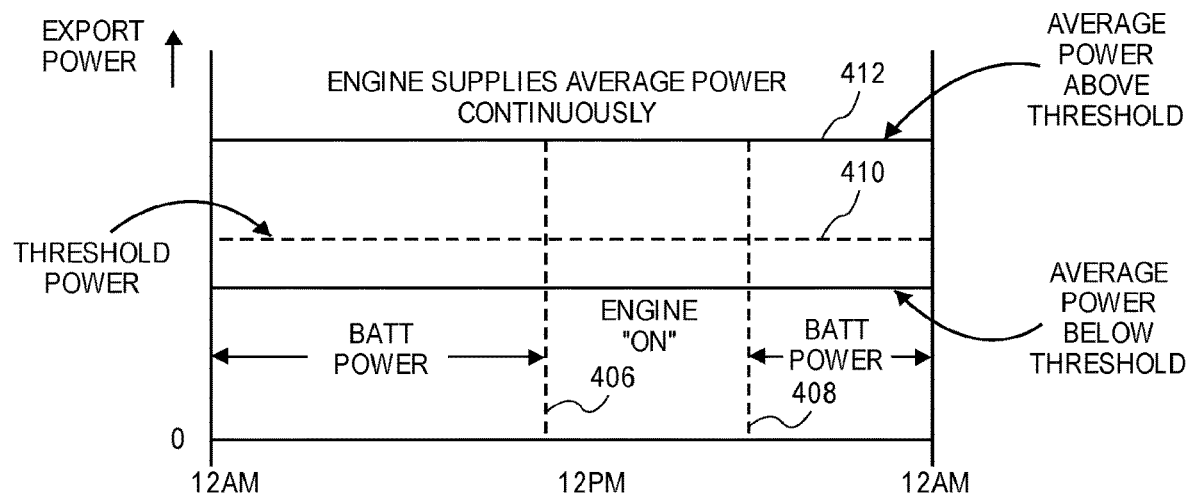

FIG. 4B depicts one possible operational control method that may be employed by the vehicle—e.g., to handle the various exemplary power demands of the grid. During the times of substantially low and/or average power demand (e.g., substantially at or below threshold 410), vehicle may be able to export power primarily via its on-board battery pack. During the occasional spike in demand (e.g., between lines 406 and 408), the vehicle may turn ON the IC engine to supply the peak power demanded for that time and/or to recharge the batteries, as desired.

During the times of higher average power demand (e.g. at or above threshold 410), the vehicle may be in a transitional state—e.g., in which the vehicle may need to rely on operating the IC engine more often to supply peak power demands. At some threshold (e.g., 412), the power demanded may be so great that the vehicle may enter a mode in which the IC engine is running substantially continuously in order to meet peak and/or average power demand. Between thresholds 410 and 412, the vehicle may transition between an "All IC Engine ON" regime and "Occasional IC Engine OFF" states.

To determine in which state the vehicle operates, vehicle may be able to receive signal indications from the grid. In one aspect, the vehicle may be able to employ power sensors (not shown) that sample and/or monitor the level of power demanded on the grid and the quality of that power on the grid. In one aspect, such information may be transmitted to the vehicle by other components connected to the grid and/or the power company. In either case, such information may be received, inputted and/or employed by the controller of the vehicle to control the operation of the vehicle.

Figure 5:
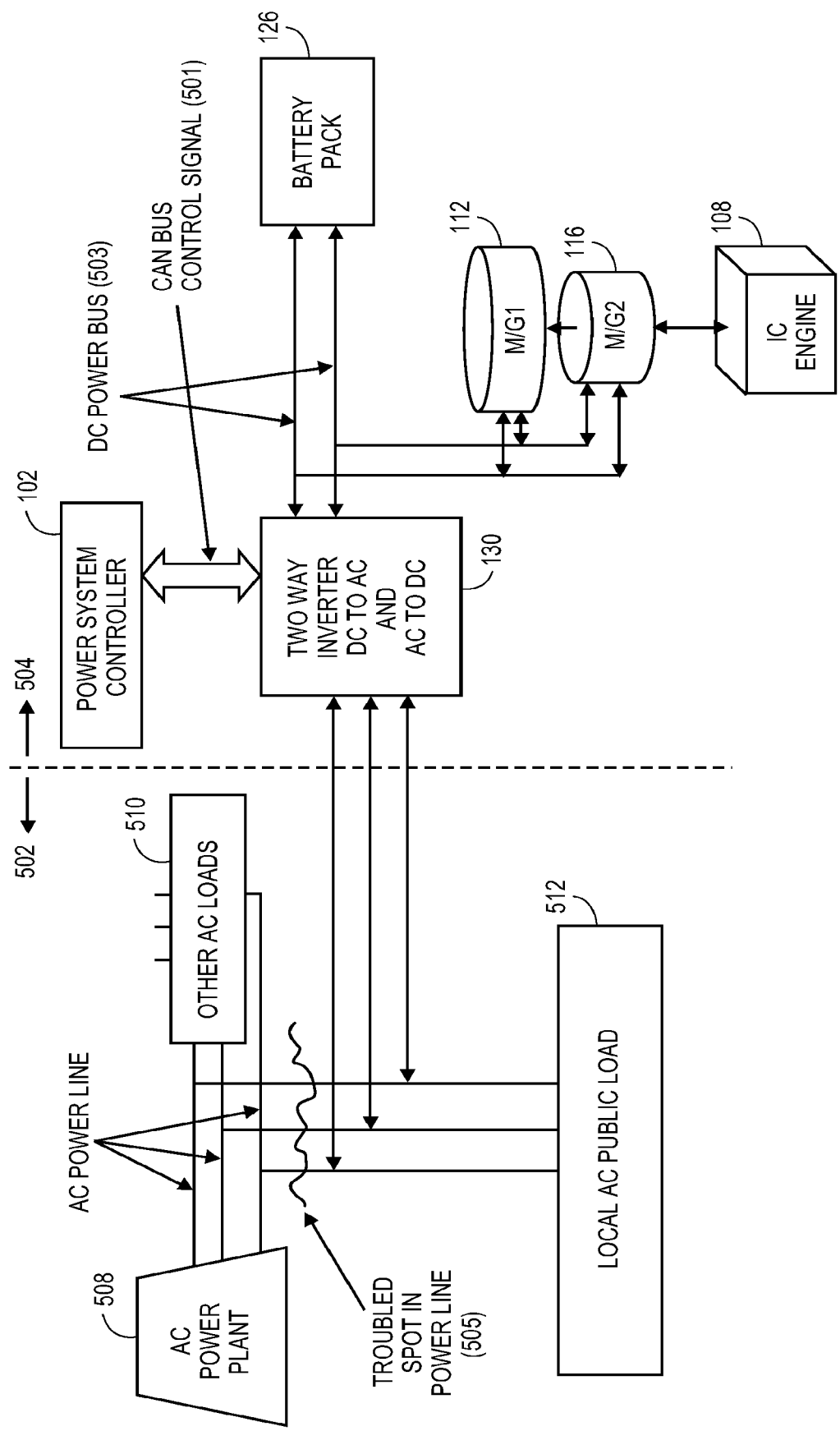
FIG. 5 depicts one exemplary scenario for the vehicle to attach to the grid and monitor and/or supply power to the grid.

FIG. 5 depicts a one example of a connection that that a vehicle may make to the grid in order to diagnose and/or supply power demand. The dotted line substantially depicts where the vehicle (in the direction of 504) connects with the grid (in the direction of 502). Vehicle may comprise many of the previous mentioned components (as well as others)—e.g., controller 102, inverter 130, CAN bus 501 providing communication between the controller and inverter, a DC Bus 503 supplying electrical power and communication between the inverter and battery pack 126, MG1 112, MG2 116 and IC Engine 108.

In operation, the vehicle may connect its inverter to the grid (in the direction of 502). The grid itself may comprise an AC power plant 508 and other AC loads 510. These loads may feed into a more local grid 512—where the vehicle may supply loads to the grid. In addition, the vehicle may monitor or otherwise become aware (e.g. receive signals) regarding trouble spots in the power line 505. Trouble spots on the grid may mean that there is more opportunity to vary the operational modes of the vehicle—e.g., to better handle any transient issues for power supplied to utility customers.

Figure 6:
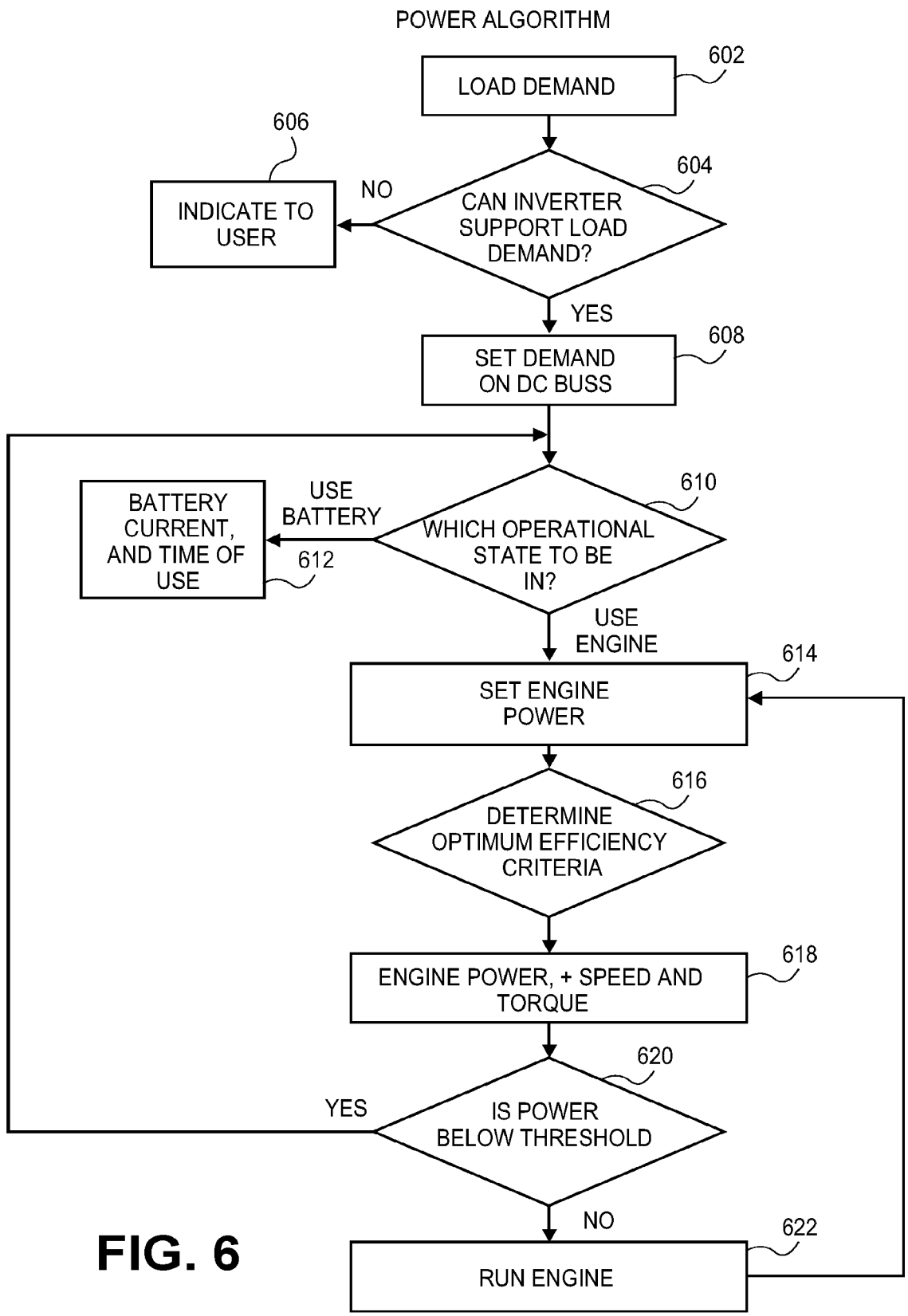
FIG. 6 is one embodiment of a power mode operating method and/or algorithm.

FIG. 6 depicts one exemplary flowchart for power mode management for the many of the vehicles mentioned herein. At 602, the vehicle/controller may receive indication and/or signals regarding load demand on the grid—e.g., where the vehicle has connected to the grid. These signals/indications may be from on-board power sensors, sampling load demands—or may be supplied by the grid itself—e.g., in the form of metadata or the like.

These signals may dynamically change over time to indicate (or otherwise correlate) whether and/or how much power is needed to be supplied to the AC power line, whether and/or how much power may be drawn from the AC power line to recharge the batteries of the vehicle, whether there is a transient power demand of the AC power line that may be supplied either by the batteries or the prime mover/IC engine (e.g., depending on efficiency considerations of the prime mover and/or batteries). Thus, in one aspect, the flowchart of FIG. 6 may loop back to 602 to test/sample/calculate/estimate load on a dynamic, substantially continual, regular, irregular and/or periodic basis.

At 604, the vehicle may determine whether the inverter may support/supply the load demand, or any portion (which may be the entire load or a part thereof) of the load demand, as noted. If not, a signal may be sent indicating "no" at 606. Otherwise, the vehicle may set the demand on the DC Bus on board at 608.

During operation, the vehicle may determine which operational state to be operating at 610. As mentioned in connection with FIG. 4B, there may be an opportunity to be in Engine ON/OFF mode—or ENGINE ALWAYS ON mode and/or state or other states as desired, depending upon the satisfaction of one or more thresholds that may be dynamically set and tested.

If the operational state/mode may allow battery usage to supply power with its electrical energy, it may do so at 612. In addition, the vehicle may be monitoring battery operating statistics/data/parameters, e.g., State of Charge (SOC), current flow, time of use, temperature—among others. If any battery operating parameters may fall out of performance thresholds, the vehicle may change operational states/mode to use the IC engine at 614. This may be accomplished by having the processing loop back from 612 to 610 (e.g., on a dynamic, substantially continual, regular, irregular and/or periodic basis) to assess any changes in battery operating parameters.

The vehicle may operate and/or set the IC engine at 614 to provide an amount of power which may be based on the load power demanded by the grid—as well as battery charge needs, as may be set by the operating parameters of the vehicle.

At 616, the vehicle may determine the substantial optimum efficiency of the IC engine (or other prime mover). In operation, it may be desirable to substantially operate the IC engine on an Ideal Operating Line (IOL), thereby generating the demanded power at substantially the highest possible efficiency that the particular engine can deliver. The vehicle may substantially set the operating characteristics of the prime mover/IC engine accordingly (e.g., power, speed, torque, etc.) at 618. It will be appreciated that other prime movers (e.g., CNG, fuel cells, etc.) may have their own IOL and sets of operating characteristics/parameters that may be controlled for their optimization. In addition, the settings of the prime mover may be dynamically adjusted/calculated/estimated over time, depending on the dynamic load demands/conditions and/or other transient conditions of power on the AC power line.

In addition, if and/or when transient load variations on the external AC load occur, the vehicle may respond to such transients with the motor-generators (as opposed to the prime mover/IC engine) since the instant power may be derived from the battery pack substantially quickly, thus making for even more efficiency and may tend to generate less waste heat. The IC engine may then be allowed to change relatively slowly as power demand is changed, supplying only the average power needed. This determination may allow the vehicle to set the engine power, speed and/or torque at 618.

At 620, the vehicle may test and/or determine with the power load demand is below any of the relevant thresholds, as previously described herein. For one example, the dynamic load demand may decrease to the point where available charge in the battery is sufficient to supply the load demand. In such a case, the vehicle may change modes to supply the load demand by the battery. In this example, the vehicle may return to determine what the operating state the vehicle should be in (at 610). If there is no need to change modes, then the engine may continue to be run at 622.

In one aspect, one operational state/mode may be to determine if there is dynamic load conditions exist (e.g., sufficient power and/or quality of power) on the AC power line to recharge the battery from the AC power line itself (e.g., instead of recharging the batteries from the prime mover). This may be desirable e.g., during times when it is more efficient to recharge the batteries than use the carbon-based fuel.

Figure 7:
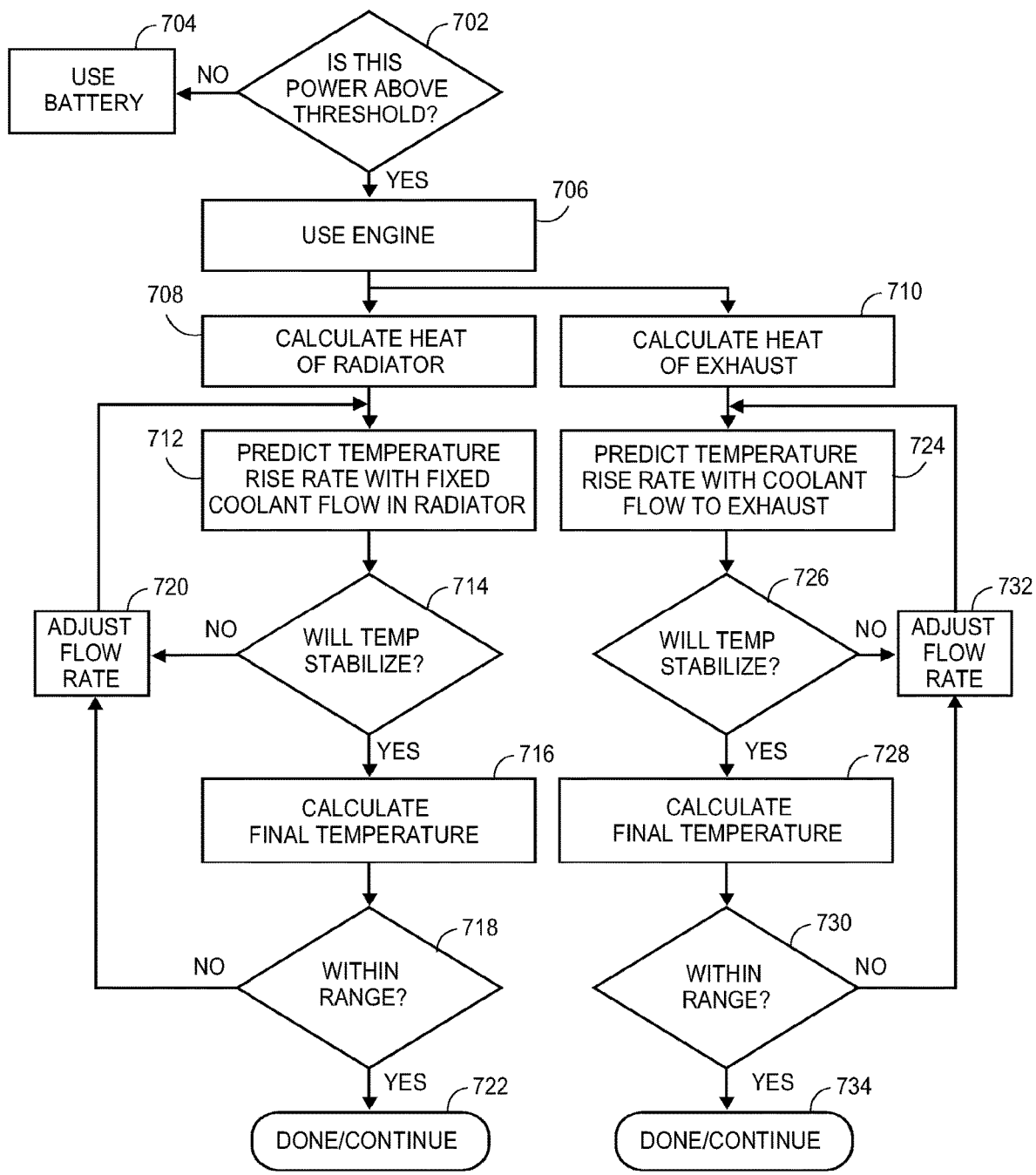
FIG. 7 is one embodiment of a thermal management operating method and/or algorithm.

FIG. 7 is one exemplary flowchart of a thermal management system algorithm for the vehicle. When the vehicle is supplying power from the prime mover, the vehicle may monitor/sense/estimate and/or otherwise calculate the operating temperature of the prime mover and/or other portions of the exhaust system, battery pack or other parts of the vehicle that may generate heat.

At 702, the vehicle may determine with the power load demanded in above a desired threshold. If not, then the vehicle may employ the batteries at 704. Otherwise, the engine may be employed at 706.

The vehicle may manage the heat in the radiator and/or the exhaust system—either singly or in combination with each other. At 708 and 710, the vehicle may measure, sample and/or otherwise calculate the heat of the radiator and/or exhaust, respectively.

At 712, the vehicle may predict the temperature with a fixed and/or presently given flow of coolant in the radiator and/or airflow over the radiator (where "flow of cooling" means flow of coolant or air, either separately or together). The vehicle may determine and/or predict whether the temperature will stabilize at 714. If so, the final temperature may be calculated/predicted and/or sampled at 716. The vehicle may determine whether this final temperature is within a desired range at 718. If not, then the vehicle may adjust the temperature by adjusting the water/coolant flow rate (from tank and/or external source) and/or the air flow rate (via fan) at 720.

On the exhaust system side, the vehicle may predict, measure, sample, derive and/or calculate the temperature rise with the presently available coolant flow to exhaust system at 724. At 726, the vehicle may determine and/or predict whether the temperature will stabilize. At 728, the vehicle may measure, calculate and/or predict the final temperature—and determine/predict at 730 whether this is in within desired ranges and/or parameters. If not, then the vehicle may adjust the rate of flow of cooling (e.g., the water/coolant and/or air flow via fans). On either side, the vehicle may determine when and how much water/coolant to spray onto desired heated surfaces of the powertrain.

Other Aspects

In other aspects, the vehicle may use a controllable DC to AC and AC to DC bi-directional inverter to convert electricity generated by a liquid or gaseous internal combustion engine or similar prime mover and a motor generator system consisting of one or more generators feeding DC power to a DC bus. The DC bus may serve to charge or discharge a large battery pack used for traction purposes of Plug-In electric vehicle as well as being used to feed the controllable bi-directional inverter. The vehicle may use this system to improve the energy conversion process as well as to minimize the waste heat generated by the IC engine or prime mover.

The inverter may employ software that is controlled by a CAN bus. This bus may allow the Inverter to transfer power from a high voltage, high power DC bus to a high power AC line in phase synchronous with the AC power line's characteristics in voltage and frequency. The CAN control bus may also allow the inverter to transfer AC power from the AC line to the DC Bus to charge the batteries of the Plug-In hybrid Electric Vehicle or drive and power auxiliary equipment on the vehicle.

The power generation IC engine system may be operated intermittently (e.g., On or Off) if the power demand is too low, thus further lowering heat rejection and increasing efficiency and lowering noise.

The water/coolant system for the IC engine may be redesigned to allow heat rejection while generating electric power when the vehicle is stationary. This may be desirable, as there may typically be a lack of cooling air because the vehicle is stationary. Thus, additional cooling system may be desired. For merely exemplary purposes, suppose 100 kW of electric power is demanded. Then the IC engine may have to generate about 120 kW of shaft power and the waste heat of the radiator may be about 120 kW and the exhaust heat may be 120 kW. In this case, it may be desired that the radiator heat and exhaust heat be carried away by air-flow or water-flow or water evaporation, and/or any combination of the above.

The waste heat may be further managed by knowing, measuring, sampling, deriving, and/or anticipating the expected load requirements. For example, it may be known that the peak load will occur at 4 pm while the minimum load will occur at 1 am. This known information may be used to allow the heat rejection system to be adjusted prior to the impending event thus minimizing the temperature variation of the normal feedback control system. In this case, it is possible to use the thermo storage capability of the cooling system to manage the temperature rise and extremes of the electrical load duty cycle. In addition, it may be possible to use the traction battery system to help supply the load during the peak so that the engine system is operated at a lower power (e.g., near the average), thus aiding thermo management. The batteries may be recharged from the IC engine during a future time at a low power demand period but at a low charge rate to minimize the battery losses and improve the battery life.

The IC engine power may be reduced to less than the instantaneously demanded AC power based on limits of the heat rejection system. The additional needed power will then be taken from the battery system. The amount of energy managed this way may depend on knowledge of the history of the specific electric power line load.

The battery state of charge (SOC) control system may take information from the AC power line and the IC engine controller. In one case, if the battery SOC is below the needed threshold then power from the AC line may be available if the demand is low. This may allow less heat to desired to be removed thus saving cooling system energy.

A Prime Mover (e.g., IC engine, Compressed Natural Gas (CNG), fuel cell or the like) requiring carbon based fuel may be operated on the Ideal Operating Line (IOL) as the batteries may be able to supply the load during the high demand periods. This may tend to reduce the heat rejection system requirements, and lead to higher efficiency of power generation from carbon based fuels.

The system may also employ a larger battery pack to be added to the system if it is desired to increase the zero emission or zero noise time period of operation at any particular time. For example, maybe it is desirable to have zero noise electrical generation between 6 pm and 10 pm and this requires a specified amount of kw-hrs of energy. In this case, an auxiliary battery pack with such a specified amount of kw-hrs of capacity may be added to the DC bus.

Battery maintenance control may be done by using electric power from the bi-directional inverter system—as well as a separate direct battery charger As noted herein, the vehicle may have two or more traction electric machines to power the vehicle and provide the electricity for this high power inverter system, but the amount of power needed from the carbon fueled engine may depend on the efficiency of electric generation. The motors may not be the same size. Thus, it may be desirable to select the combination of motors that may tend to lead to higher efficiency and thus lower fuel consumption and also less heat rejection needed from the IC engine or other style of prime mover such as fuel cells or NG engines . . .

During refueling of the vehicle while the vehicle is supplying energy to an AC grid, the engine may be shut off to allow additional fuel to be added safely. During this time, the AC power will be supplied by the traction battery system.

Auxiliary Electrical Energy Generation

Figure 8:
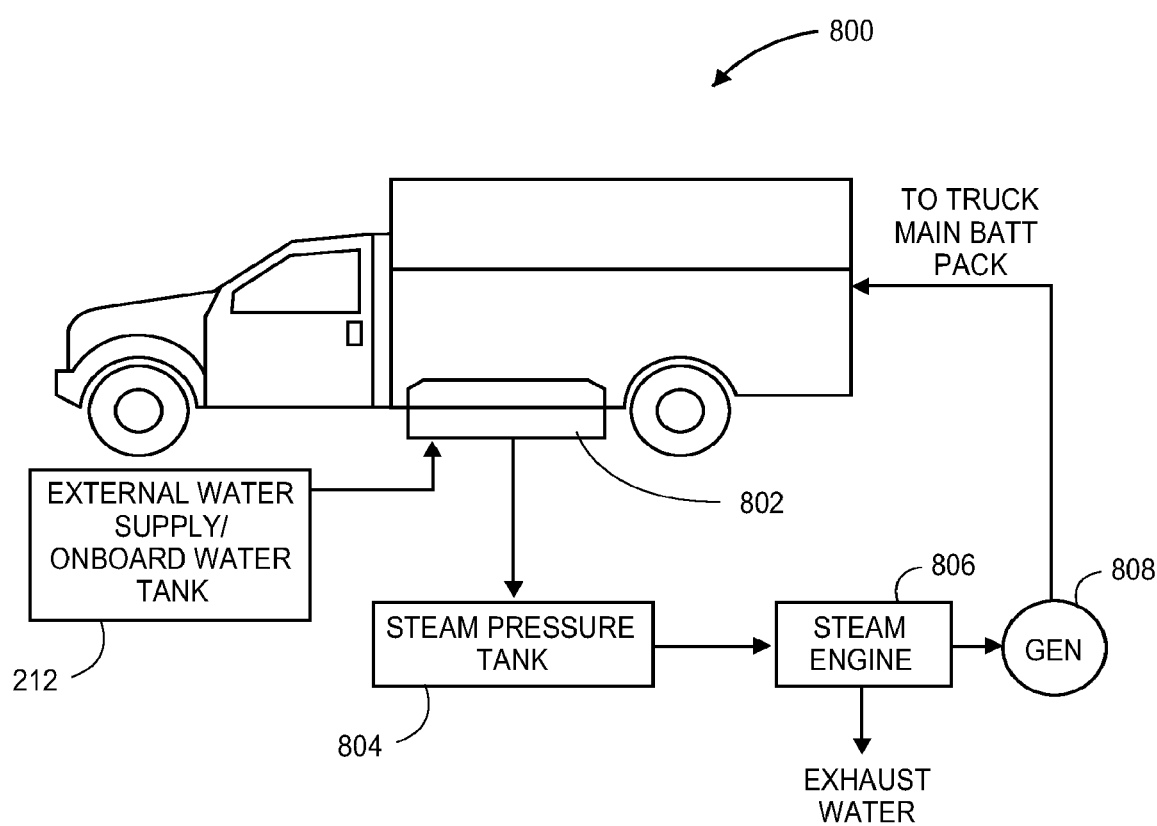
FIG. 8 is one embodiment of a steam engine for recovering some electrical energy from cooling.

FIG. 8 is one example of a vehicle 800 that may generate electrical energy from waste heat produced by the prime mover and/or the exhaust system of the vehicle. Vehicle 800 may comprise all or some of the components mentioned in connection with other vehicles described herein. In addition, vehicle 800 may employ the water supply 212 (e.g., either from onboard tank or external supply) to cool parts of the prime mover and/or exhaust system 802. The water and/or coolant may produce steam vapor (or be induced into another phase, like a vapor) and pressurize a tank and/or container 804. The pressured steam and/or coolant vapor may then drive a steam (or coolant vapor) engine 806 (and, possibly producing exhaust water/coolant). This engine may in turn drive a generator 808 that may supply electrical energy back to the vehicle/grid and/or batteries, as desired.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

We claim:

1. A vehicle for connecting to an Alternating Current (AC) power line, the vehicle comprising:
   a prime mover;
   an electric motor-generator;
   a battery electrically coupled to the electric motor-generator and configured to receive from or supply electrical energy to the electric motor-generator;
   an inverter electrically coupled to the battery and capable of connecting to the AC power line; and
   a controller configured to dynamically affect a flow of electrical power to or from the AC power line, the controller including a processor and a non-transient computer readable storage medium comprising instructions that, when executed by the processor, cause the vehicle to:
   receive signals indicative of an electrical load demand on the AC power line and a battery State of Charge (SOC); and
   responsive to the AC power line demanding an electrical load:
      send signals to supply power generated with the prime mover to the inverter and by the inverter to supply electrical power to the AC power line; and
      charge the battery with the prime mover responsive to the battery SOC being below a threshold.

2. The vehicle of claim 1, wherein the prime mover comprises an internal combustion (IC) engine or a fuel cell.

3. The vehicle of claim 2, wherein the IC engine consumes gasoline or natural gas.

4. The vehicle of claim 2, wherein to supply power to the AC power line comprises driving the electric motor-generator with the IC engine.

5. The vehicle of claim 1, wherein the instructions, when executed by the processor, cause the vehicle to send signals to the inverter to take electrical power from the AC power line to charge the battery in response to the AC power line not demanding the electrical load.

6. The vehicle of claim 1, wherein the vehicle further comprises a thermal management system including a coolant system and at least one airflow fan, wherein the instructions, when executed by the processor, cause the vehicle to adjust flow rate in the thermal management system to stabilize a temperature of the prime mover when the prime mover is supplying the electrical power to the AC power line.

7. The vehicle of claim 1, wherein the instructions, when executed by the processor, cause the vehicle to operate the prime mover according to an Ideal Operating Line (IOL).

8. The vehicle of claim 7, wherein the instructions, when executed by the processor, cause the battery and the prime mover to deliver the electrical power to the AC power line when the demanded electrical load exceeds a demand threshold.

9. The vehicle of claim 7, wherein the instructions, when executed by the processor, cause the battery and the prime mover to deliver the electrical power to the AC power line during peak demand periods.

10. The vehicle of claim 1, wherein the instructions, when executed by the processor, cause the controller to:
    determine an optimum efficiency of the prime mover; and
    dynamically set operating characteristics of the prime mover to operate the prime mover according to an Ideal Operating Line (IOL) of the prime mover such that the prime mover is able to operate at the optimum efficiency.

11. The vehicle of claim 1, wherein the instructions, when executed by the processor, cause the vehicle to send signals to the inverter to export the electrical power from the battery in response to the electrical load demand being below a demand threshold.

12. The vehicle of claim 1 wherein the instructions, when executed by the processor, cause the vehicle to send signals to turn on the prime mover to supply the electrical power during peak periods in response to the electrical load demand from the AC power line being above a demand threshold.

13. A method for transferring power from or to a vehicle to or from an Alternating Current (AC) power line, the method comprising:
    electrically connecting an inverter of the vehicle to the AC power line, the vehicle including a prime mover, an electric motor-generator, a battery electrically coupled to the electric motor-generator and configured to receive from or supply electrical energy to the electric motor-generator, and a controller including a processor and a non-transient computer readable storage medium comprising instructions that, when executed by the processor, cause the vehicle to:
    receive signals indicative of an electrical load demand on the AC power line and a battery State of Charge (SOC); and
    responsive to the AC power line demanding an electrical load:
       send signals to supply power generated with the prime mover to the inverter and by the inverter to supply electrical power to the AC power line; and
       charge the battery with the prime mover responsive to the battery SOC being below a threshold.

14. The method of claim 13, wherein the prime mover comprises a fuel cell.

15. The method of claim 13, wherein the vehicle further comprises a thermal management system including a coolant system and at least one airflow fan, the method further comprising: adjusting a flow rate in the thermal management system to stabilize a temperature of the prime mover when the prime mover is supplying the electrical power to the AC power line.

16. The method of claim 13, further comprising operating the prime mover on the Ideal Operating Line (IOL).

17. The method of claim 16, further comprising delivering the electrical power to the AC power line with the battery and the prime mover during peak demand periods.

18. The method of claim 13, further comprising supplying the electrical power by the battery and the prime mover to deliver the electrical power to the AC power line when the demanded electrical load exceeds a demand threshold.

19. The method of claim 13, further comprising delivering the electrical power to the AC power line with the battery and the prime mover during peak demand periods.

20. The method of claim 13, further comprising exporting the electrical power from the battery in response to the electrical load demand from the AC power line being below a demand threshold.

21. The method of claim 13, further comprising taking electrical power from the AC power line to charge the battery in response to the AC power line not demanding the electrical load.

* * * * *